(12) United States Patent
Misra et al.

(10) Patent No.: US 6,294,282 B1
(45) Date of Patent: Sep. 25, 2001

(54) TWO WAY BATTERY VENT CAP USING CUP VALVES

(75) Inventors: Sudhan S. Misra, North Wales, PA (US); Franz M. Wagner, Zionsville, IL (US); Stephen L. Mraz, Warrington, PA (US)

(73) Assignee: C & D Charter Holdings, Inc., Wilmington, DE (US)

( * ) Notice: Subject to any disclaimer, the term of this patent is extended or adjusted under 35 U.S.C. 154(b) by 0 days.

(21) Appl. No.: 09/257,432

(22) Filed: Feb. 25, 1999

Related U.S. Application Data

(60) Provisional application No. 60/076,003, filed on Feb. 26, 1998.

(51) Int. Cl.$^7$ ....................................... H01M 2/12
(52) U.S. Cl. ................................. 429/54; 429/83
(58) Field of Search .................. 429/82, 83, 72, 429/84, 85, 86–89, 53–55, 57

(56) References Cited

U.S. PATENT DOCUMENTS

| | | |
|---|---|---|
| 1,527,426 * | 2/1925 | Cook . |
| 1,920,261 * | 8/1933 | Lavender . |
| 2,480,861 * | 9/1949 | Jaworski et al. . |
| 2,516,084 * | 7/1950 | Wells . |
| 2,894,524 * | 7/1959 | Gill . |
| 3,944,437 * | 3/1976 | Auerbach . |
| 4,068,043 | 1/1978 | Carr ........................ 429/22 |
| 4,246,324 | 1/1981 | de Nora et al. .............. 429/17 |
| 4,374,907 * | 2/1983 | Chuang et al. . |
| 4,606,982 | 8/1986 | Nelson et al. ............... 429/59 |
| 4,637,966 | 1/1987 | Uba et al. .................. 429/57 |
| 4,769,299 | 9/1988 | Nelson ....................... 429/57 |
| 4,871,428 | 10/1989 | Misra et al. ............... 204/2.1 |
| 5,068,160 | 11/1991 | Clough et al. ............... 429/72 |
| 5,182,178 | 1/1993 | Brizendine et al. ........... 429/160 |
| 5,185,221 | 2/1993 | Rampel ....................... 429/59 |
| 5,682,671 | 11/1997 | Lund et al. ................. 29/623.2 |
| 5,768,906 | 6/1998 | Tsenter ....................... 62/480 |
| 5,981,099 * | 11/1999 | Bourbeau . |
| 6,051,332 * | 4/2000 | Verhoog et al. . |

FOREIGN PATENT DOCUMENTS

| | | |
|---|---|---|
| 56-168366 A * | 12/1981 | (JP) . |
| 61-188855 A * | 8/1986 | (JP) . |
| 62-115652 A * | 5/1987 | (JP) . |
| 62-115653 A * | 5/1987 | (JP) . |
| 62-115654 A * | 5/1987 | (JP) . |
| 1-248456 A * | 10/1989 | (JP) . |
| 2-037663 A * | 2/1990 | (JP) . |
| 99/41798 * | 8/1999 | (WO) . |

OTHER PUBLICATIONS

David Linden, Handbook of Batteries, Second Edition, Mc–Graw–Hill, Inc., New York 1995, p. 23.7.*

* cited by examiner

*Primary Examiner*—Stephen Kalafut
*Assistant Examiner*—Susy Tsang
(74) *Attorney, Agent, or Firm*—Hoffmann & Baron, LLP

(57) ABSTRACT

A vent valve is capable of mechanical attachment to a lead acid battery through vent hole structure provided in the case cover. The vent valve is a molded hollow tubular housing having a cup portion, the bottom of which rests atop the battery case, and a neck portion extending through an opening into the battery case. The neck carries cam members on its outer surface which are engaged by similar opposed surfaces or pins on a portion of the case so that, when the cup bottom is seated on a sealing gasket on the case cover and the vent valve is rotated, it is secured and sealed to the case cover. A barrier extends across the inside of the vent valve housing and blocks passage of gases. A pair of oppositely directed valve openings through the barrier establish vent passages which are defined by nozzles protruding through the barrier in opposite directions. Each nozzle is covered by a resilient cup valve member arranged to yield to a higher pressure within a cup at predetermined pressure differentials. Limit means are positioned relative to the cup members to limit the amount of movement of the respective cups away from its nozzle.

26 Claims, 3 Drawing Sheets

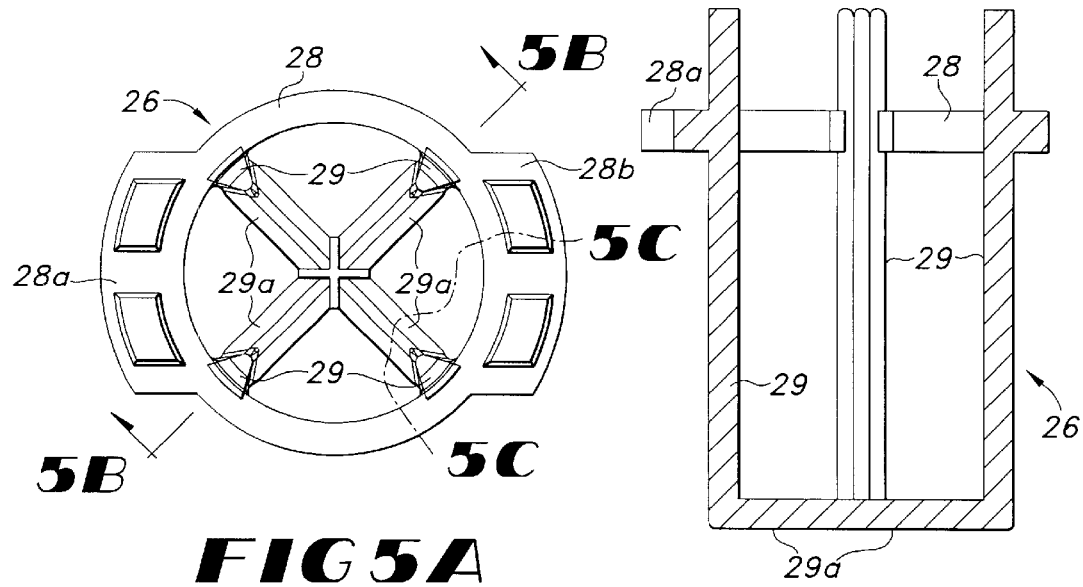
FIG 5A
FIG 5B
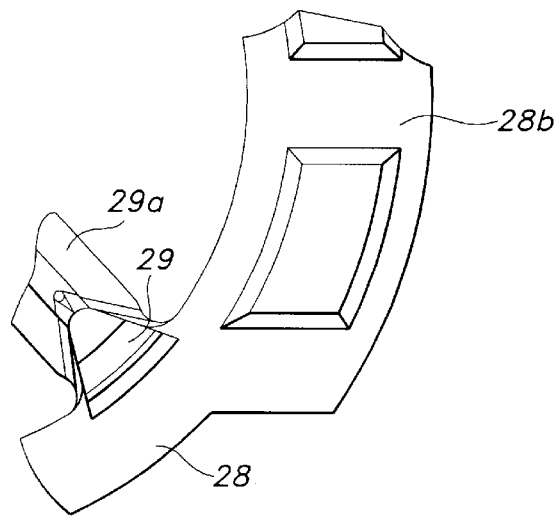
FIG 5C

TWO WAY BATTERY VENT CAP USING CUP VALVES

CROSS-REFERENCE TO RELATED APPLICATIONS

Priority is claimed herein to U.S. Provisional Application No. 60/076,003, filed Feb. 26, 1998, which is incorporated by reference herein.

FIELD OF THE INVENTION

A lead acid battery vent valving assembly is provided for the ventilation of battery cases. The valving assembly includes separate valves for relief of, respectively, excess gas and partial vacuum within the battery case incident to electrochemical reaction internal to lead-acid batteries.

BACKGROUND OF THE INVENTION

This patent application relates to lead-acid batteries, particularly to valve-regulated lead-acid batteries for discharging gas pressure above a predetermined threshold from a battery case and for the relief of partial vacuum below a predetermined threshold within a battery case.

The electrochemical reaction within batteries, particularly lead acid batteries, results in gases in the interior of the battery case. Excess build-up of gases can stress the case of the battery and even rupture the case. Similarly, extreme reduction in pressures within the case can implode the battery if proper ventilation is not provided.

Typically battery cases are ventilated by a single valve. The valve provides a release of excess pressure caused by the creation of gases internal to the battery case, but does not operate to raise internal pressure to relieve a partial vacuum condition.

In accordance with the invention a two way valve is provided for providing either vacuum or pressure build-up relief internal to a battery case. Additionally, the valving assembly provided may include an assembly extending into the battery case to secure certain catalysts known to aid in the recombination of hydrogen with oxygen within a lead-acid battery environment. These catalysts, which are generally noble metals, with palladium being the preferred catalyst, serve to "mop up" the hydrogen and to recombine the mopped up hydrogen with oxygen to make water. This water serves to replace water lost during battery operation. Free hydrogen can actually diffuse through the case of the battery or can otherwise escape to atmosphere. Hence, if free hydrogen is not recombined with oxygen, the net result is loss of water by the battery, with the battery eventually drying out and failing.

SUMMARY OF THE INVENTION

This invention in one of its aspects provides in combination a vent valve and vacuum release valve for a lead-acid battery. The combination battery valve may be provided as an original equipment part of a lead-acid battery or may be retrofitted into lead-acid batteries already in commercial service in customer locales.

The invention relates further to a vent valve for a lead acid battery. The vent valve has a hollow tubular housing, at least part of which fits within the vent into the battery case and may be secured thereto. Another part of the housing overlies the case in position for engaging a sealing member between the case and the vent valve. A barrier extends across the housing and blocks passage of gases. A pair of oppositely directed valve openings extend through the barrier. Valve means on opposite sides of the barrier covering the valve opening are supported on the structure in normally closed positions. Each of the valve means yields to higher pressure on the opposite side of the barrier from the valve means to open that valve to relieve that higher pressure.

In a preferred embodiment, a pair of oppositely directed valve openings, each extends through the barrier. Each valve opening is defined by a nozzle extending from the barrier in the opposite direction from the other. Each nozzle is normally covered by a resilient cup valve member arranged to yield to a higher pressure of a predetermined level within the cup and nozzle. Limit means are supported within the tubular housing on opposite sides of the barrier to limit the amount of movement of each of the respective cups, along their respective axes away from the supporting nozzle.

Additionally, a cage for a catalyst may be affixed to the battery valve structure with the cage permanently retaining a catalyst cartridge free to move to some degree within the cage.

BRIEF DESCRIPTION OF THE DRAWINGS

The foregoing summary, and the following detailed description, will be best understood when read in conjunction with the attached figures, in which:

FIG. 5A is an enlarged top view of the catalyst assembly and support structure shown separated from the battery vent valve assembly of FIGS. 1, 2 and 4.

FIG. 5B is a sectional view of the catalyst assembly and support structure taken along lines 52—52 in FIG. 5A.

FIG. 5C is an enlarged partial view of the structure shown in lower right portion of FIG. 5A within dot and dash line 5C—5C.

DETAILED DESCRIPTION OF THE PREFERRED EMBODIMENTS AND

BEST MODE KNOWN OR PRACTICING THE INVENTION

IN ACCORDANCE WITH 35 U.S.C. '112

This invention provides a battery vent valving assembly. Two elastomeric cup valves are positioned to provide ventilation to a battery case. A first pressure relief valve releases gases from the interior of the battery case to the atmosphere upon the accumulation of the interior gases above a certain designed pressure. A second vacuum relief valve relieves partial vacuum interior to the battery case. The second valve permits the inlet of air from the atmosphere external to the battery case when internal pressure drops below a predetermined differential with atmospheric pressure. A hydrating catalyst may be secured to the vent valving assembly and positioned to extend beneath the valving assembly for recombining hydrogen with oxygen molecules so as to prevent water loss in the battery.

Figure 6:
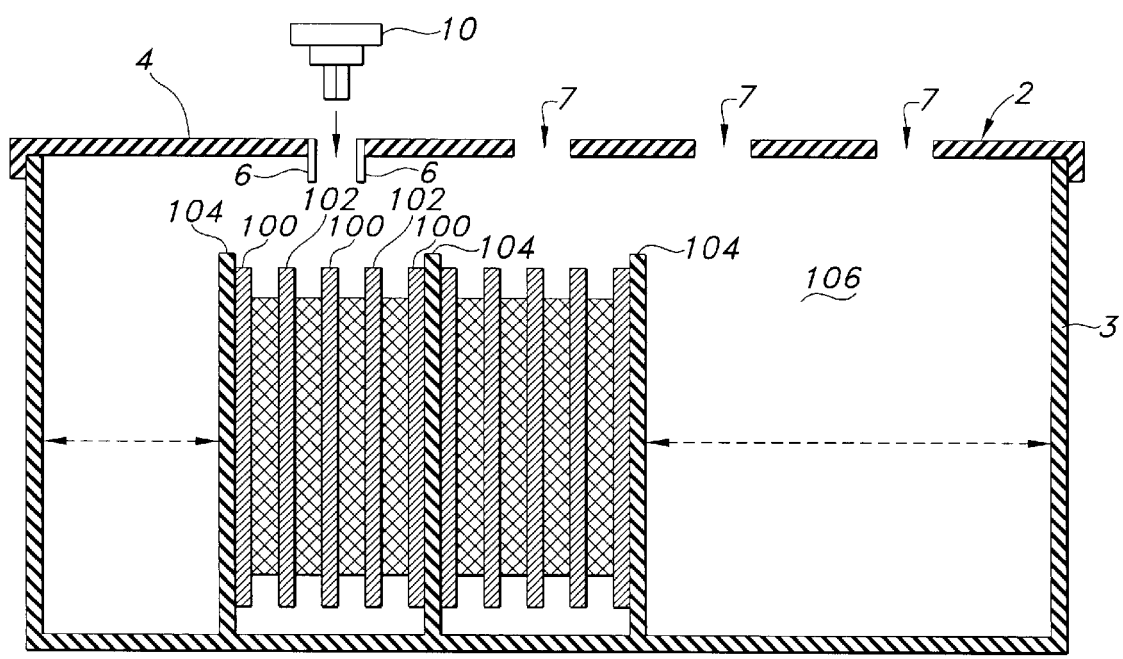
FIG. 6 is a schematic vertical section through a battery manifesting aspects of the invention.

This invention provides a battery/vent valve assembly/ catalyst carrier for carrying a hydrating catalyst for recombining residual gases produced during electrolytic reaction of lead-acid battery elements while simultaneously conserving liquid loss. The battery is represented in an incomplete and highly schematic diagram in FIG. 6. The valve is positioned to provide pressure relief from inside the battery case 106 to atmosphere upon accumulation of gases above a certain pressure within battery 2, only a fragment of a cover 4 of which is shown in FIG. 6. Battery 2 is preferably of the recombinant type employing positive and negative electrodes and electrolyte.

Plates of the same polarity are preferably connected together and preferably to a terminal penetrating cover 4 in a sealed relationship. The cover and case are preferably of the same flexible molded resinous material, sealed together after assembly.

The vent valve-catalyst carrier assembly 10 preferably extends into battery 2 via cover 4 through an integrally molded cylindrical collar 6 to provide a vent opening 7, permitting venting of gases from inside case 106 when pressure exceeds a predetermined level and, in this case also venting of air from outside the battery into the inside of the case 106 when partial vacuum therein drops to a predetermined level below atmosphere. Hydrating catalyst support cage 26 is advantageously supported at the internal end of the vent valve-catalyst carrier assembly 10 to promote recombining hydrogen and oxygen molecules so as to prevent water loss from battery 2.

Figure 3:
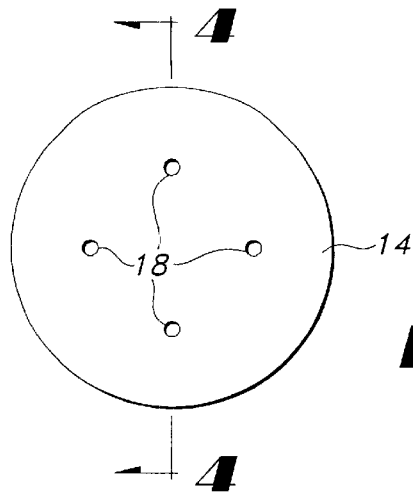
FIG. 3 is a top view of the structure of FIGS. 1 and 2.
Figure 1:
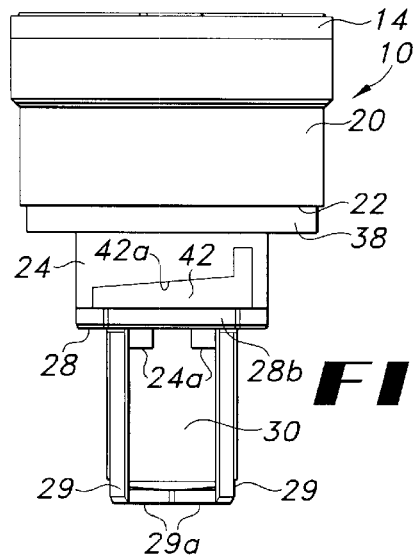
FIG. 1 is a side elevational view of the battery vent valving assembly having attached supporting cage for a catalyst and manifesting aspects of the invention.
Figure 4:
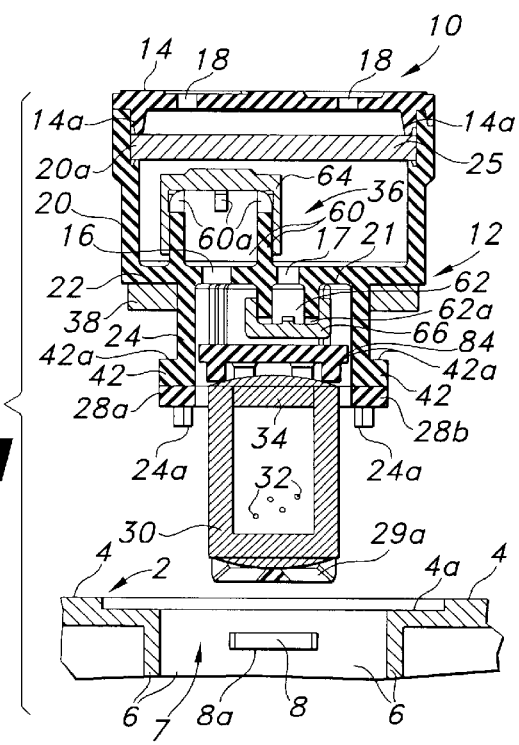
FIG. 4 is a sectional view taken along line 4—4 of FIG. 3, showing interior structure of the battery vent valving assembly and attached catalyst assembly.
Figure 2:
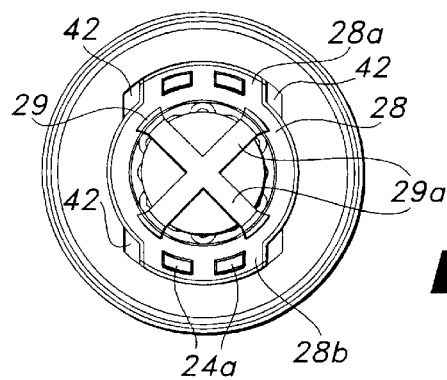
FIG. 2 is a bottom view of the battery vent valving assembly of FIG. 1 showing the catalyst cage assembly.

A preferred embodiment of the battery vent valve-catalyst carrier assembly, generally designated 10, is illustrated in FIGS. 1 to 4. Vent valve-catalyst carrier assembly 10 is ready for installation into a battery through vent opening 7 in cover 4 as shown in FIG. 4. The battery vent valve-catalyst carrier assembly 10 preferably has a tubular molded resinous valve housing 12. The top part of valve housing 12 is cup-shaped with cylindrical sidewalls 20 and a generally flat bottom 22. The bottom part of the housing 12 is a tubular neck 24, which is preferably coaxial with the cup sidewalls 20. A pair of valves, generally designated 36, lie on the cup axis and extend through a barrier 21 integral with and extending across valve housing 12, in this embodiment through an extended bottom 22.

Lower tubular cylindrical neck 24 is integrally molded with the cup-shaped top part of housing 12, from whose bottom 22 the neck 24 extends. The top of cup-shaped cylindrical side walls 20 is closed by a top cover 14, which as seen in FIG. 3 is penetrated by small vent holes 18. A shoulder 20a formed in cylindrical side wall 20 supports a porous disk 25, preferably of porous polyethylene, which serves to block flames or sparks external to the battery case 106 from entering the case. Top cover 14 is preferably frictionally coupled to the valve housing 12 by integrally mounted top cover tabs 14a positioned to fit snugly inside cup-shaped sidewall 20 to hold top cover 14 in place. Top cover 14 and valve housing 12 are preferably molded from polypropylene.

Neck 24 of valve housing 12 is dimensioned for fitting through a battery vent hole 7, defined by integrally molded cylindrical collar 6 extending inward from battery cover 4 as seen in FIGS. 4 and 6. When assembled to the cover 4, the bottom of valve housing 12 rests atop the battery cover 4 in a recessed portion 4a with annular sealing gasket 38 positioned around neck 24. Sealing gasket 38 may preferably be polyvinyl chloride (PVC). Collar 6 preferably carries opposed blocks 8 molded on its inside surface. The lower surface of each block 8 provides a cam surface 8a. The cylindrical neck 24 preferably has integrally molded on its outer cylindrical surface radially outwardly protruding cam blocks 42, providing locking cam shoulders 42a on a top surface of cam blocks 42. The top surfaces of cam shoulders 42a cooperate with downwardly facing cam surfaces 8a on opposed blocks 8 (or bayonet locking pins in other embodiments) projecting inwardly at the appropriate level from and within collar 6. This enables vent valve-catalyst carrier assembly 10 to be secured in the vent opening 7 of the battery case 106 by clockwise rotation.

Cam surface 8a and cam shoulder 42a cooperate conventionally, allowing cam block 42 and block 8 to engage, coupling vent valve-catalyst carrier assembly 10 to battery casing cover vent collar 6. When seated on the gasket 38, battery vent valve-catalyst carrier assembly 10 is secured and sealed to battery cover 4. Cylindrical neck 24 provides a channel for gas passing through one of the normally closed valves 36, as seen in FIG. 4.

Neck 24 supports catalyst cage 26 so that catalyst cage 26 extends further into the battery case 106, as seen in FIG. 4. Catalyst cage 26, as seen in FIGS. 5A, 5B and 5C, carries a hydrating catalyst 32 encased in a catalyst gas permeable stone enclosure 30, as shown in FIG. 4. Hydrating catalyst 32 may include pellets, flakes, or the like of one of the noble metals or noble metal alloys. A preferred hydrating catalyst 32 is palladium. One suitable material for permeable stone enclosure 30 is marketed by General Electric Company under the name "Raton". The stone enclosure 30 is preferably cylindrical, having an open end which is filled with epoxy 34 to secure the pellets of the hydrating catalyst 32 in place.

Catalyst cage 26 shown in FIG. 5B is preferably injection molded in one piece of polypropylene copolymer. A circumferential collar 28 on the cage 26 abuts the end of neck 24 and has integrally molded peripheral extensions 28a and 28b for supporting the cage 26. Each peripheral extension 28a, 28b has conforming openings for snugly receiving integrally molded pins 24a extending from the bottoms of cam blocks 42 parallel to one another and to the axis. Once the pins 24a are inserted through the conforming openings and the collar 28 is moved into flush contact with the bottom of neck 24, pins 24a are heated and deformed to secure cage 26 to the neck 24.

Cage 26 may be of many constructions, in this case providing a skeleton of cylindrical form having preferably four elemental side bars 29 of preferably generally triangular cross-section whose ends are joined to the end cross bars 29a of similar cross-section forming a bottom closure. The sidebars 29 and crossbars 29a extend above collar 28 and lie flush against the inside surface of tubular neck 24.

The stone enclosure 30 is gas permeable so that the hydrating catalyst 32 can aid in recombination of hydrogen and oxygen within the battery case 106 to ensure the battery 2 does not prematurely fail due to water loss. One cause of such water loss is diffusion of hydrogen molecules out of the battery case 106.

The coaxial cage 26 and the catalyst stone enclosure 30 are located along the flow path into and out of neck 24 to which the cage 26 is attached. Catalyst stone enclosure 30 preferably has an axial dimension less than the length of the cage 26 such that enclosure 30 can move axially and there is free flow about enclosure 30. The radial dimension of stone enclosure 30 is selected to slidably engage the walls of catalyst cage 26. The movement of the stone enclosure 30 enables water condensate to drain from hydrating catalyst 32.

Molded integrally with the valve housing 12 is the barrier 21, which in this embodiment is an extension of the bottom 22, through which is provided at least one pressure relief aperture 16 and at least one vacuum relief aperture 17. Surrounding pressure relief aperture 16 is an outwardly projecting cylindrical nozzle 60 integrally molded with and supported on the barrier 21. Outward nozzle 60 has lateral vent slots 60a at its other edge remote from the barrier 21. Surrounding vacuum relief aperture 17 is an inwardly projecting cylindrical nozzle 62 integrally molded with and supported on the barrier 21. Inward nozzle 62 has lateral vent slots 62a at its inner edge remote from the barrier 21. The vent slots 60a and 62a give their respective nozzles 60, 62 a castellated appearance. Alternatively, vent holes may be provided through the nozzles 60 and 62 near their ends remote from their barrier 21. Covering outward nozzle 60 is snugly fitting resilient cup valve 64 of rubber or other elastic material whose side walls snugly engage those of outward nozzle 60. Cup valve 66 is similar to cup valve 64 and is similarly secured to the inward nozzle 62 by frictionally engaging overlapping sidewalls of inward nozzle 62. Operation of cup valves 64 and 66 is dependent upon internal gas pressures which overcome the resilient force holding the cup valve 64, 66 sidewalls to the nozzle 60, 62 sidewalls to permit gas to escape at a lip of the cup valve 64, 66 between the side walls of cup valve 64, 66 and nozzle 60, 62 walls. Upward movement of cup valve 64, if it would occur at all, is limited to the spacing between outward nozzle 60 and porous disc 25, which distance is shorter than the length of the cup valve 64 sidewalls. In addition to functioning as a stop or limiting barrier, porous disc 25 also acts as a fire barrier.

As gas pressure builds within the battery case 106, the elastic force of cup valve 64 on outward nozzle 60 tends to hold cup valve 64 in place. The gas exerts a force laterally upon the cup valve 64 sidewalls through lateral vent slots 60a. After pressures exceed a predetermined threshold, the cup valve 64 sidewalls unseat from outward nozzle 60 sidewalls sufficiently to discharge gases from the battery case 106 to the atmosphere external of the battery case 106 through the cup valve 94 walls up through porous disc 25 and vents 18 in the cover 14. The cup valve 64 is held in position by sidewall contact friction with the outward nozzle 60 over much of their interface. Should the cup valve 64 unseat, however, porous disk 25 acting as limiting means will prevent sufficient movement to bring the end of the cup valve 64 sidewalls above the vents 60a. The porous disc 25 is supported on shoulder 20a molded into the sidewall 20 of the housing 12 and held in place by cover tabs 14a, frictionally engaged on the inner wall of sidewalls 20 of the housing 12. Porous disk 25 is preferably manufactured of porous polyethylene and serves to block flames or sparks external to the battery case 106 from entering the battery case 106. Vent holes 18 in top cover 14 permit flow of gases between the housing 12 and the outside atmosphere.

The operation of cup valve 66 relative to inward nozzle 62 is essentially the same but reversed in direction since it is a partial vacuum inside the battery case 106 which causes the action. The higher atmospheric pressure which extends inside the housing 12 and inward nozzle 62 moves the sidewalls of cup valve 66 away from inward nozzle 62. Higher pressure atmospheric air will then flow through the space created by deflection of cup valve 66 walls to increase the pressure in the partial vacuum within the case 106. Should there be a tendency for cup valve 66 to displace axially from inward nozzle 62, movement of the cup valve 66 is limited by a porous wall 84, so that a lip of the cup valve 66 does not extend beyond lateral vent slots 62a. Porous wall 84 is supported by an integral ring structure on porous wall 84, which abuts the top of the stone enclosure 30.

Specifically, the actuation of either cup valve 64, 66 to facilitate pressure release is dictated by the properties of the rubber utilized to manufacture the cup valves 64, 66 along with the elastic release pressure between the walls of the cup valves 64, 66 and the surfaces of the nozzles 60, 62. For example, a rubber composition having a durometer value of 50 yields a release pressure of 0.5 to 5.0 p.s.i. As pressure rises above the durometer-controlled threshold, the cup valve 64, 66 sidewalls unseat, discharging gas between those walls and the walls of its supporting nozzle 60, 62.

FIG. 6 is a schematic representation of a battery 2 with detail omitted for the purpose of showing the subject matter of the invention. This battery 2 has a molded resinous case 106 including a jar 3 and a cover 4 of the same molded material. After the assembly of internal parts is completed, cover 4 is sealed to jar 3.

Battery case 106 has molded integrally with it internal partitions 104 extending from the bottom of the case 106 to above the general level of positive plate 100 and negative plates 102 and from wall to wall. The space above partitions 104 allows for interconnections of plates of the same polarity in each cell and to terminals (not shown) which penetrate cover 4 at various openings which are then sealed to the terminals.

In some cases the terminals serve many or all cells; in other cases individual terminals are provided for each cell. In the case where the partitions 104 extend to cover 4, separate terminals are needed for each cell. Separate vent valve bodies may also be necessary for each cell, as well as separate catalyst carriers.

The form of battery illustrated in FIG. 6 is not intended to be limiting in any way and it should be understood that the invention is intended to pertain to many forms of lead-acid batteries.

The terms and expressions which have been employed herein are used as terms of description and not of limitation. There is no intention in the use of such terms and expressions of excluding any equivalents of the features shown and described or portions thereof. It is recognized, however, that various modifications are possible within the scope of the invention as claimed.

We claim the following:

1. A lead-acid battery vent valve apparatus to relieve excessive positive and negative gas pressure within the battery, comprising:

a hollow housing, a first part of which fits within a vent in a battery case and a second part overlying the case;

a barrier extending across the housing and blocking passage of gases;

a pair of oppositely directed valve openings through the barrier; and a pair of valves, each valve located on an opposite side of the barrier and covering the respective valve opening, each valve yielding to a higher pressure present on a side of the barrier opposite the respective valve to relieve the higher pressure.

2. The apparatus of claim 1, wherein the second part of the housing has a generally planar shoulder at a point of attachment to the first part of the housing.

3. The apparatus of claim 1, wherein the second part of the housing is cup-shaped, with a bottom attached to the first part of the housing, the first part of the housing having a tubular neck shape with a diameter to fit within the vent in the battery case, whereby the second part of the housing overlies the battery case adjacent the vent in the battery and is sealed thereto by a gasket between the second part of the housing and the battery case.

4. The apparatus of claim 1, wherein the first part of the housing is cylindrical and includes a means for locking the apparatus to the battery case, securing and sealing the apparatus against the gasket.

5. The apparatus of claim 3, wherein the first part of the housing includes at least two outwardly protruding cam block members, each cam block member provides a generally upward-facing cam surface which engages compatible cam block members on the battery case.

6. The apparatus of claim 5, wherein the housing is molded of resinous material and the outwardly protruding cam block members are integrally molded with the housing.

7. The apparatus of claim 1, wherein the first part of the housing has attached thereto an extending cage for enclosing a catalyst used to induce the combination of freed hydrogen and oxygen to form water, the cage being positioned and arranged so that gases passing through the apparatus in either direction pass through the cage, engaging the catalyst.

8. The apparatus of claim 7, wherein the first part of the housing is provided with molded members providing cam surfaces to interlock with blocks on the battery to secure the apparatus to the battery.

9. The apparatus of claim 3, wherein the first part of the housing supports a cage which retains a catalyst used to induce the combination of freed hydrogen and oxygen to form water, the cage positioned so that gasses passing through the apparatus pass through the cage.

10. The apparatus of claim 9, wherein the cage is cylindrical and includes side members aligned generally parallel to the cylindrical axis of the cage, the side members being joined at one end by cross-members, the side members and cross-members retaining a permeable stone enclosure which retains the catalyst.

11. The apparatus of claim 1, further comprising a gas permeable wall located across a horizontal cross section of the housing, providing a fire barrier preventing ignition sources from entering the battery through the apparatus.

12. The apparatus of claim 1, further comprising an impermeable cover having at least one vent hole restricting the flow of gases through the apparatus.

13. A lead-acid battery vent valve apparatus to relieve excessive positive and negative gas pressure within the battery, comprising:
a molded resinous housing comprising an upper cylindrical cup-shaped portion and a lower cylindrical tubular portion, the lower cylindrical tubular portion molded integrally and coaxially with a bottom of the upper cylindrical cup shaped portion;
a barrier extending across a horizontal cross section of the lower cylindrical tubular portion, blocking the passage of gases therethrough; and
a pair of oppositely directed valve openings through the barrier; and
a pair of valves, each valve located on an opposite side of the barrier and covering the respective valve opening, each valve yielding to a higher pressure present on a side of the barrier opposite the respective valve and opening to relieve the higher pressure.

14. A lead-acid battery vent valve apparatus to relieve excessive positive and negative gas pressure within the battery, comprising:

a hollow housing, a first part which fits within a vent in a battery case cover and a second part which overlies the battery case cover engaging a sealing member between the battery case cover and the housing;
a barrier extending across the housing and blocking passage of gases;
a pair of oppositely directed valve openings through the barrier providing vent passages defined by nozzles surrounding the respective valve openings and extending from the barrier in opposite directions, each nozzle covered by a resilient cup valve member having sidewalls embracing the nozzle and arranged to yield to a higher pressure of a predetermined level within the cup valve member; and
limit means supported on and within the hollow housing and positioned to limit the amount of movement of each of the respective cup valve members.

15. The apparatus of claim 14, wherein the nozzles are cylindrical and are integrally molded with the barrier and are provided with castellated tops providing lateral vent slots through which gases escape from, or enter into, the battery.

16. The apparatus of claim 15, further comprising a gas permeable disk located across a horizontal cross section of the second part of the housing and above the barrier, the disk being spaced from the end of one of the nozzles through which gases escape from the battery less than the length of the respective cup valve member sidewall to prevent the cup valve member from disengaging one of the nozzles when gases escape from the battery, the permeable disk also providing a fire barrier, preventing ignition sources external to the battery from entering the battery.

17. The apparatus of claim 14, wherein the second part of the housing is generally a cup-shaped member with a bottom attached to the first part of the housing, the first part of the housing having a tubular neck shape designed to fit within the vent in the battery case, whereby the bottom of the second part of the housing overlies the battery case and is sealed thereto by a gasket placed there between.

18. The apparatus of claim 14, wherein the first part of housing is cylindrical and includes a means for securing the apparatus to the battery.

19. The apparatus of claim 18, wherein each cup valve member is a rubber material, and each nozzle includes lateral vent slot openings, the cup valve members contacting the nozzle around the lateral vent slot openings to maintain the vent slot openings in a closed position, the rubber material being selected and designed to yield to a predetermined pressure differential, whereby the cup valve members are lifted from the respective nozzles at the predetermined pressure differential, venting gases through the vent slot openings.

20. A lead-acid battery vent valve apparatus to relieve excessive positive and negative gas pressure within the battery, comprising:
a molded resinous housing comprising an upper cylindrical cup shaped portion and a lower cylindrical tubular portion molded integrally and coaxially with a bottom of the upper portion;
a barrier extending across a horizontal cross section of the lower cylindrical tubular portion, blocking the passage of gases therethrough; and
a pair of oppositely directed valve openings through the barrier providing vent passages defined by nozzles surrounding the respective valve openings and extending from the barrier in opposite directions, each nozzle closed by a resilient cup valve member having sidewalls embracing the nozzle and arranged to yield to a predetermined pressure within the cup valve member.

21. The apparatus of claim 20, further comprising limit means positioned to restrict the amount of movement of the cup valve members away from the respective nozzle.

22. A recombinant lead-acid battery comprising:
a. a case having at least one venting aperture therein;
b. a plurality of positive and negative plates within the case; and
c. a vent valve assembly communicating with the venting aperture including:
  i. a first valve relieving pressure internal of the battery in excess of a predetermined level above ambient; and
  ii. a second valve relieving partial vacuum internal of the battery in excess of a predetermined level below ambient.

23. A recombinant lead-acid battery comprising:
a. a case having at least one venting aperture therein;
b. a plurality of lead-acid cells within the case, each cell including positive and negative plates;
c. a plurality of the cells being in vapor communication with one another; and
d. a vent valve assembly in vapor communication with the aperture and with the vapor communicating cells, the vent valve assembly including:
  i. a valve relieving partial vacuum internal of the vapor communicating cells in excess of a predetermined level below ambient;
  ii. a catalyst cage located within the path of gases flowing through the assembly; and
  iii. catalyst material retained within the cage in vapor communication with the vapor communicating cells for enhancing recombination of hydrogen and oxygen evolved at the plates of the cells into water.

24. A recombinant lead-acid battery comprising:
a. a case having at least one venting aperture therein;
b. a plurality of positive and negative plates within the case; and
c. a vent valve assembly communicating with the venting aperture including:
  i. a valve relieving partial vacuum internal of the battery in excess of a predetermined level below ambient;
  ii. a catalyst cage located within the path of gases flowing through the assembly; and
  iii. catalyst material retained within the cage in vapor communication with the plates for enhancing recombination of hydrogen and oxygen evolved at the plates into water.

25. The battery of claim 24, wherein the catalyst is palladium.

26. The battery of claim 24, wherein the catalyst cage is located within the case.

* * * * *

UNITED STATES PATENT AND TRADEMARK OFFICE
CERTIFICATE OF CORRECTION

PATENT NO. : 6,294,282 B1
DATED : September 25, 2001
INVENTOR(S) : Misra et al.

It is certified that error appears in the above-identified patent and that said Letters Patent is hereby corrected as shown below:

<u>Title page,</u>
ABSTRACT, line 15, the printed patent incorrectly reads "Each nozzle is covered by...". The patent should read -- Each nozzle is normally covered by... --.

<u>Column 24,</u>
Line 24, the printed patent incorrectly reads "The electrochemical reaction".
The patent should read -- The electro-chemical reaction --.

<u>Column 2,</u>
Line 40, the printed patent incorrectly reads "...taken along lines 52-52 in Fig. 5A". The patent should read -- ...taken along lines 5B-5B in Fig. 5A --.

<u>Column 5,</u>
Line 41, the printed patent incorrectly reads "...the cup valve 94 walls up". The patent should read -- ...the cup valve 64 walls up --.

Signed and Sealed this

Thirtieth Day of April, 2002

Attest:

*Attesting Officer*

JAMES E. ROGAN
*Director of the United States Patent and Trademark Office*